United States Patent [19]

Naylor

[11] 4,420,890

[45] Dec. 20, 1983

[54] MICROMETER ADJUSTABLE BACKGAUGE

[76] Inventor: Nelson A. Naylor, 3941 Rocky View Dr., Norco, Calif. 91760

[21] Appl. No.: 350,718

[22] Filed: Feb. 22, 1982

[51] Int. Cl.³ .......................... G01B 5/02; B21D 11/22
[52] U.S. Cl. .................................... 33/180 R; 33/170; 72/36
[58] Field of Search ................. 33/170, 180 R, 181 R, 33/185 R; 72/32, 34, 36

[56] References Cited

U.S. PATENT DOCUMENTS

| 2,924,260 | 2/1960 | Guarino | 72/36 |
| 3,217,416 | 11/1965 | Bachert et al. | 33/170 |
| 3,666,227 | 5/1972 | Frederick | 33/170 |
| 3,704,611 | 12/1972 | Hirsch | 72/36 |
| 3,812,695 | 5/1974 | Roch | 72/36 |
| 3,826,119 | 7/1974 | Marotto | 72/36 |
| 4,137,643 | 2/1979 | Carmel | 33/185 R |
| 4,139,948 | 2/1979 | Tsuchiya et al. | 33/180 R |

FOREIGN PATENT DOCUMENTS 832240 4/1960 United Kingdom .................. 33/170

Primary Examiner—Richard R. Stearns
Attorney, Agent, or Firm—Gordon K. Anderson

[57] ABSTRACT

A backgauge locator which provides manual adjustment of the backgauge relative to the die elements of a machine tool press brake. When used in pairs, each probe tip is contiguous with the outer edge of the workpiece to prevent parallel misalignment. The body is slideably attached to the machine tool backgauge to compensate for varying widths of the workpiece having an over-center spring loaded cam for manual positioning. A probe is pivotally located in the body and spring loaded to engage a micrometer head providing controlled linear movement. The probe pivots upward to allow for secondary bends of the workpiece without damaging the precision micrometer head and the tension spring also acts as a return mechanism to reposition the probe when the workpiece is removed.

8 Claims, 12 Drawing Figures

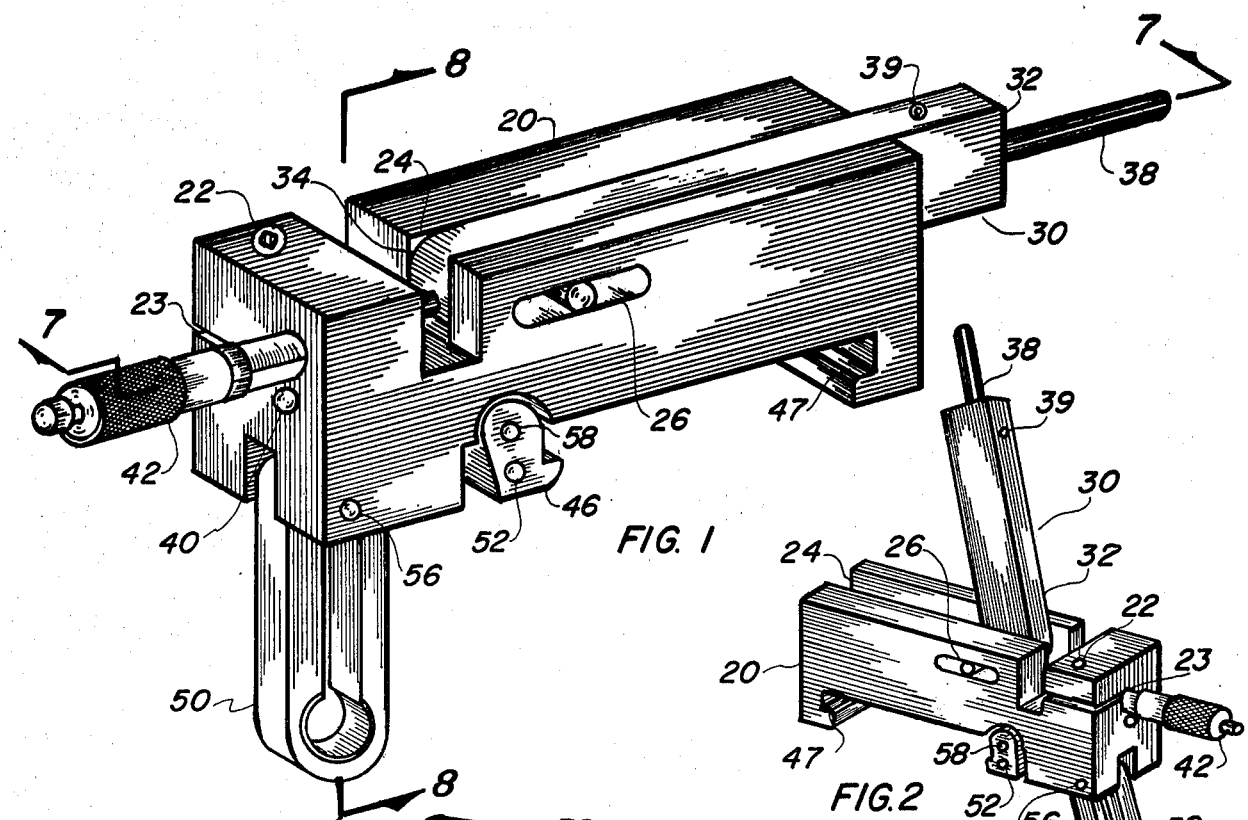
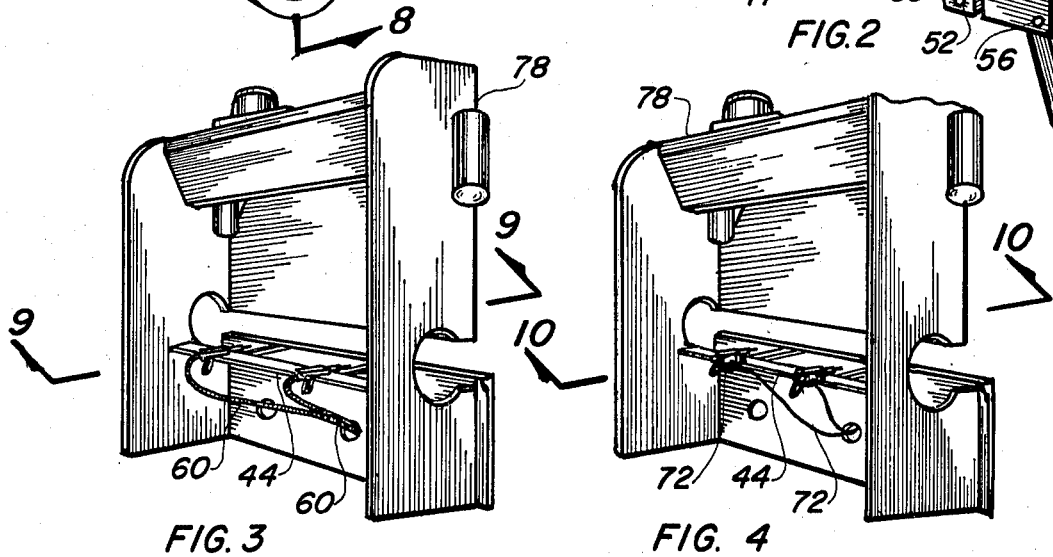
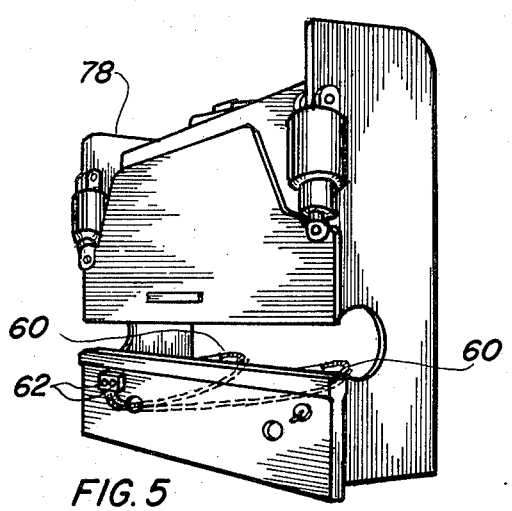
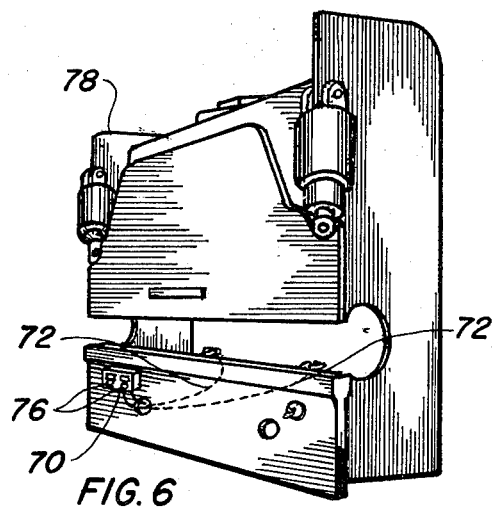

MICROMETER ADJUSTABLE BACKGAUGE

BACKGROUND OF THE INVENTION

1. Field of the Invention

This invention relates in general to machined parts and micrometer screw adjustment instruments for distance. More specifically, to backgauges for machine tool press brakes with micrometer adjustable probes.

2. Description of Prior Art

Previously, backgauges for press brakes have been limited to mechanical stops such as pins or angles attached to the screw adjustment mechanism of the press brake itself. Attempts have been made to utilize a more precision gauge for registering the workpiece, such as taught by Skinner et al in U.S. Pat. No. 2,638,141 where set screw adjustable engaging pins attach a template with tooling holes in the workpiece. This, however, requires measurement and manual adjustment of the pins with a screw to assure proper alignment with the die set and a special template.

Fournier discloses in U.S. Pat. No. 4,244,110 an air actuated linear analog voltage positioned workpiece end locator utilizing the machine tools existing computer, receiving various signals from the machine positioning the device with a transducer and servomechanism communicated with air actuators. While the purpose is achieved, the method is sophisticated requiring a tool having a computer and air source.

Both Harper, in U.S. Pat. No. 3,200,508, and Kelleher, in U.S. Pat. No. 3,702,502, disclose a device to assure alignment of the female and male dies in a press brake, but are not concerned with the backstop adjustment.

For background purposes and as indicative of the state of the art to which the invention relates, reference may be made to U.S. Pat. No. 1,843,362, issued to Hazelton.

SUMMARY OF THE INVENTION

The disclosed invention teaches a backgauge stop that is micrometer adjustable. Previously, backgauges on press brakes consisted of a pin or structural shaped member attached to a screw actuated stop. To form bends in material, the operator adjusts the backgauge to the desired location using a scale to measure the approximate length. A sample is then formed and measured and final adjustment is then made by the same device until the proper dimension on the workpiece is obtained. If a slight misalignment exists between the extreme ends, the stops are manually moved, usually by a threaded fastener, but occasionally on older equipment by a sheet meal bar and a C-clamp. When the set-up is made, the forming continues until completed and another set-up is required. On small runs and complex parts, set-up takes a majority of the operators time.

It is, therefore, the primary object of the invention to fill the need for a backstop device that may be adjusted easily and accurately with repeatable results. The instant apparatus may, therefore, accomplish this purpose. In practice, the rough measurement is made by a graduated rule setting the backstop by a hand crank located on the brake. A sample part is made and measured. The difference in length is ascertained and the adjustment is made to the backstop by the micrometer knowing the exact dimension that is required with only one adjustment rather than a stochastic trial and error procedure. On a given press brake, actual time has been measured using existing procedures with an improvement of 300% when the micrometer adjustable backgauge was used. An important object allows the workpiece to be adjusted on either outside end, as the invention is used and calibrated in pairs, therefore, parallel alignment is guaranteed and slight angular brakes may be made with calculatable ease.

Another object allows the probe to rotate upward and out of the way to protect the micrometer from secondary bends. A tension spring returns the probe to its normal horizontal position and also maintains tension on the probe engaging the micrometer spindle.

Still another object provides a removable probe extension to allow large material to be contiguous with the probe body itself, providing an increased surface for the workpiece stop.

Yet another object includes a quick release over-center cam holding device to quickly relocate the apparatus in relationship to their center distance, easily compensating for the width of the workpiece or its irregular shape or form.

A further object provides for remote adjustment of the micrometer depicted in another embodiment. The adjustment may be made mechanically from the front of the press with a flexible shaft attached directly to the thimble of the micrometer head. A graduated vernier dial is mounted on the press itself at a convenient location to the operator. Further, the object may be accomplished in the same manner in a yet another embodiment, except an electro mechanical arrangement is utilized, with a servomotor attached to the micrometer providing linear analog voltage or the like to a controller with digital readout.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment removed from the mounting plate and press brake.

FIG. 2 is a partial isometric view of the preferred embodiment with the probe rotated vertically and the compression handle rotated to release the device from the mounting plate.

FIG. 3 is a partial isometric view of a pair of the apparatii mounted on a press brake with mechanical remote adjustment, as viewed from the rear.

FIG. 4 is a partial isometric view of a pair of the apparatii mounted on a press brake with electro mechanical adjustment, as viewed from the rear.

FIG. 5 is a partial isometric view of a pair of the devices installed on a press brake with mechanical remote adjustment, as viewed from the front.

FIG. 6 is a partial isometric view of a pair of the devices installed on a press brake with electro mechanical adjustment, as viewed from the front.

DESCRIPTION OF THE PREFERRED EMBODIMENT

Referring now in detail to the drawings and describing the preferred embodiment, the invention consists of a rectangular shaped body 20 fabricated of structural material, such as aluminum or any other substance having like characteristics. On one end of the body 20 contains a slotted bore 23, slightly off-set from the centerline and near the top. A micrometer head 42 is inserted into the bore and a threaded fastener 22 provides the compression to maintain the integrity of the union without distortion. The threaded fastener 22 may be in any form with a socket head cap screw being preferred. The thimble of the micrometer extends outward from the body 20 for ease of manual manipulation and visualization of the indicia located thereon.

Figure 7:
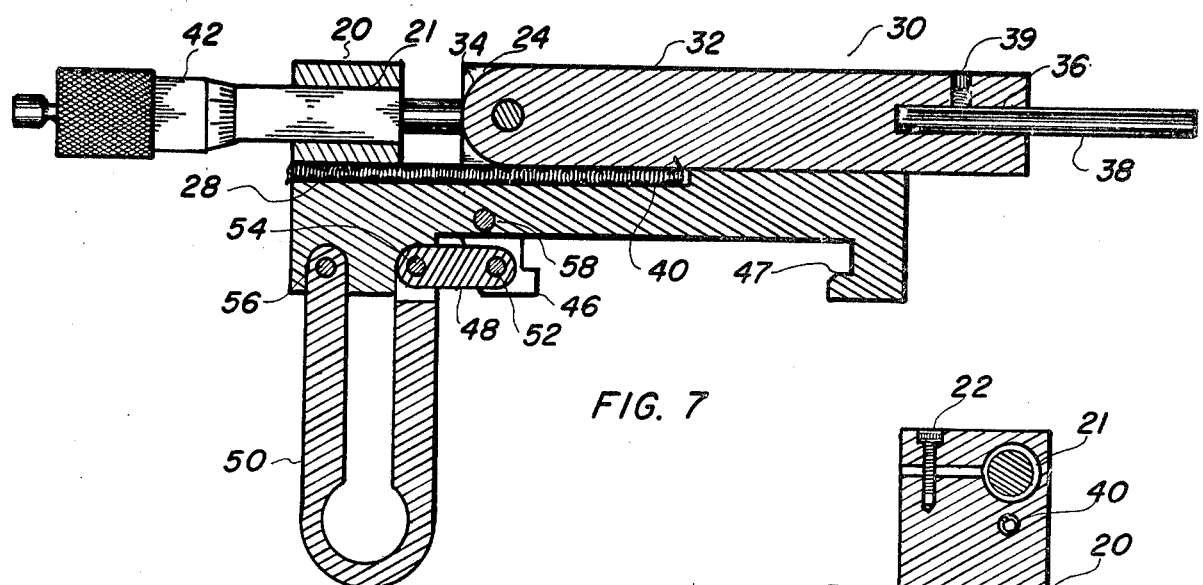
FIG. 7 is a cross-sectional view taken along lines 7—7 of FIG. 1.
Figure 8:
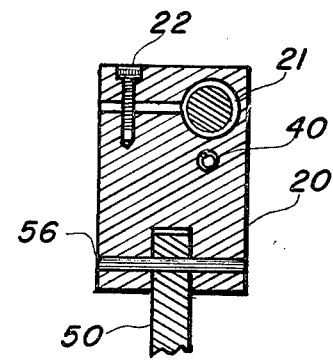
FIG. 8 is a cross-sectional view taken along lines 8—8 of FIG. 1.
Figure 9:
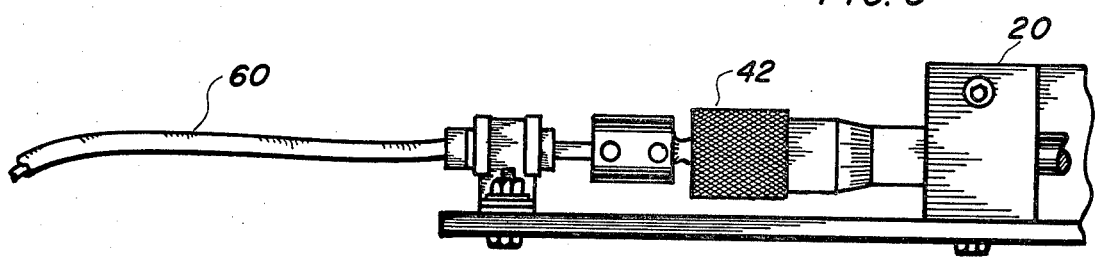
FIG. 9 is a partial view taken along lines 9—9 of FIG. 3.

In alignment with the spindle of the micrometer is a longitudinal groove 24 extending the length of the body, except where the micrometer itself is affixed. This groove 24 is on the top of the body and has a spring containing cavity 28 integral with the bottom slightly narrower than the groove and starting perhaps half the distance from the end opposite the micrometer. This cavity continues to the micrometer end in the shape of a round hole. The cavity 28 may be round or square at the bottom or a combination of both. A slot 26, best illustrated in FIGS. 1 and 7, is centrally located in the body vertical wall and extending therethrough being in alignment with the horizontal center of the longitudinal groove 24.

An adjustable probe 30 is positioned within the groove 24, and being slightly smaller, moves freely forward and aft and vertically. The probe 30 has a body 32 in rectangular shape that embraces the spindle of the micrometer head 42 on one end and extends beyond the body 20 on its longitudinal axis on the other. The probe 30 is axially attached by a rotation pin 31 that penetrates the probe at a radius point 34 of the first end and extends into the slot 26 of the body 20. This allows vertical movement of the probe 30 up to at least 90 degrees and horizontal movement within the bounds of slot 26. This movement allows the probe 30 to clear a workpiece when multiple bends are formed by the press brake to which it is attached. The end opposite the radiused end 34 contains a centrally located bore 36 to receive an extension member. The extension 38 is detachable from the body 32 and extends forward allowing a large workpiece to be contiguous with the end surface of the body 32. The extension is held in place by fastening means such as a set screw.

The probe 30 includes tensioning means, preferably a coil spring 40, that is attached on the central underside of the probe body 32, and fits into the cavity 28 distending to the micrometer end of the body 32 and attached thereon. The spring 40 serves two purposes. It applies tension on the probe 30 to maintain contact with the micrometer 42 spindle, allowing the micrometer to be adjusted through a selected range within precise increments of linearity fore and aft inside the bounds of the slot 26. Also, the spring 40 returns the probe 30 to its horizontal position after the multiple bends have been made on the workpiece. A horizontal mounting plate 44, best shown in FIGS. 3 and 4, is installed on a machine tool press brake 78 on the apparatus normally holding the backstop. This plate 44 is rectangular in shape and is large enough to have the structural integrity to maintain its form the full length of the brake, or at least the length of the die set. The plate 44 moves forward and aft within the range of the mechanical adjustment provided on the press brake itself and provides a convenient mounting surface for the instant apparatii. The plate 44 is parallel to the die set and provides the adjustable depth gauge when the invention is installed thereon. The micrometer adjustable backgauge is attached to the plate 44 with the shape of the body 20 conforming to the plate on the top and the front side, further, a lip 47 partially encloses the bottom. The back or other side of the plate 44, is grasped by an over-center cam lock 46 that is rotatably affixed to the body 20 with a cam lock pin 58 that penetrates both elements. This adjustable grip compresses the sides of the apparatus to the mounting plate making it secure and providing a positive stop, as the front is always contiguous with the plate 44. A cam link 48 is rotatably coupled to the over-center cam lock 46 with a pin 52 providing communication to move the cam lock 46 linearly.

Attached to the link 48 with a roll pin 54 is a compression handle 50 in "U" shape with a longitudinal slit essentially the full length. The handle 50 is likewise attached to the body 20 with a roll pin 56 allowing rotation. When the handle 50 is in the forward position, the over-center cam 46 is pressed against the plate 44 through the link 48, as the handle 50 is slightly compressed maintaining the pressure. As the linkage and lock is over the cam center, the handle 50 remains in the compressed position continuing the compression against the plate 44. When the handle 50 is moved to the rearward position, the linkage is released from the over-center position and the tension is relieved, allowing the apparatus to be laterally adjusted or removed from the plate.

Figure 11:
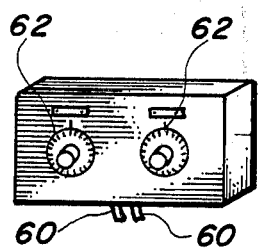
FIG. 11 is a plan view of the mechanical remote adjustment means graduated selector knob.
Figure 10:
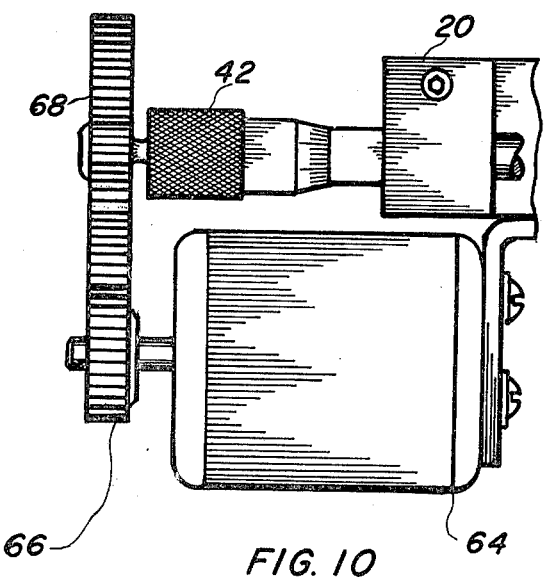
FIG. 10 is a partial view taken along lines 10—10 of FIG. 4.
Figure 12:
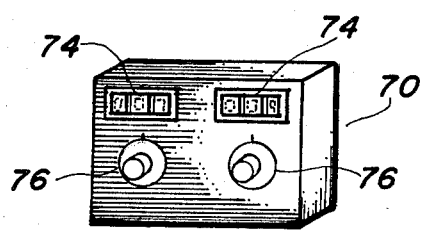
FIG. 12 is a plan view of the electro mechanical remote adjustment means with motor drive means and visual digital display.

In another embodiment, best shown in FIGS. 3, 5, 9 and 11, the device is used in conjunction with remote means to adjust the micrometer head from the front of the press brake. This is more convenient, as the operator does not have to go to the back of the brake, or unsafely reach between the dies. One configuration utilizes a flexible shaft 60, illustrated in FIG. 9, attached on one end to the thimble of the micrometer head 42 and on the other to a graduated selector knob 62. The knob 62, shown in FIG. 11, is mounted in a box or structure on the front of the press brake 78, usually in pairs. The shaft 60 is positioned through an opening in the front face of the brake 78 that provides access for wiring controls, etc., normally associated with the machine tool. The knob 62 is vernierly graduated with the same increments as the micrometer and is imprinted in like manner, so as to visually read the setting and linear position of each micrometer head.

Another configuration utilizes a system with a motor attached to the micrometer head 42 and controls in the front. This may be accomplished by electro mechanical, pneumatic or hydraulic means. The preferred embodiment, best depicted in FIGS. 4, 6, 10 and 12, uses a servomotor 64 with a drive gear 66 attached to the shaft and a driven gear 68 on the thimble of the micrometer 42. The gears intermesh and transmit torque and rotation, also changing the ratio of the motor 64 to the micrometer 42. An electrical conduit 62 transmits linear analog voltage or an electrical current to actuate the motor 64 from motor driving means 70, which may be any circuitry suitable for the application including, but not limited to, a dial knob 76 and a visual display 74, preferably of LED (light emitting diode) type indicating the position of the micrometer head 42.

In operation the invention is used in pairs with a slight offset provided in the probe 32 and micrometer head 42 from the body 20, best illustrated in FIG. 1, which is shown in a right hand configuration. The offset provides the devices to be in close proximity and produce a minimum distance between centers of the probes 32. The backgauges are slideably located along the mounting plate 44 to coincide with the edges of the workpiece and firmly attached by manipulation of the compression handle 50. Adjustments are made manually from the micrometer 42 itself or remotely from the front in other embodiments.

With the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

I claim:

1. A micrometer adjustable backgauge for locating a workpiece in a machine tool press brake, having a mechanical adjustable backgauge comprising:
    (a) a body having a first and second end, said body including means for attaching said body to said press brake,
    (b) an adjustable probe having means on one end pivotally and slideable mounting said probe on said body for sliding movement toward and away from said press brake and pivotal movement about an axis parallel to said press brake, the other end of said probe extending outward from the body for engaging said workpiece, and,
    (c) a micrometer head having a sleeve, thimble and spindle compressedly affixed into said body first end at said sleeve with said thimble extending outward from the body and said spindle contiguous to said probe for adjustably positioning said probe from said body.

2. The body, as recited in claim 1, further comprising: means to hold said micrometer head, having at least one threaded fastener to provide compression thereof, the body further having a longitudinal groove in alignment with said micrometer for slideably receiving said adjustable probe within its peripheral outline, said body having a slot therethrough centrally located with said adjustable probe having an extension for containment therein, the body also having a spring containing cavity, integral with the longitudinal groove.

3. The apparatus, as recited in claim 1, wherein the adjustable probe further comprises:
    a probe body with a first and second end, said first end being radiused allowing pivoting for clearing said workpiece when multiple bends are formed by said press brake, said second end having a bore receiving a detachable extension and probe tensioning means for maintaining the probe in a contiguous relationship with said micrometer head.

4. The apparatus, as recited in claim 3, wherein said probe tensioning means further comprises:
    a tensioning spring attached on the first end to said adjustable probe and on the second end to said body, for maintaining said contiguous relationship with said micrometer head.

5. The device, as recited in claim 1, wherein the brake attaching means further comprises:
    (a) a horizontal mounting plate attached to said machine tool press brake providing a surface parallel to a die set in said brake,
    (b) an over-center cam lock rotatably affixed to said body providing an adjustable grip to compressingly secure said apparatus to said horizontal mounting plate,
    (c) a cam link rotatably coupled to said over-center cam lock providing communication to demountably attach said cam lock to said mounting plate, and,
    (d) a compression handle having a longitudinal slit therethrough rotatably attached on the first end to said body and on the second end to said cam link compressingly urging said over-center cam lock against said mounting plate compressingly securing said apparatus thereto and releasing therefrom when said cam lock is rotated oppositely.

6. A micrometer adjustable backgauge for locating a workpiece in a machine tool press brake having a mechanical adjustable backgauge comprising:
    (a) a body having brake attaching means,
    (b) an adjustable probe having means on one end pivotally and slideably mounting said probe on said body for sliding movement toward and away from said press brake and pivotal movement about an axis parallel to said press brake, the other end extending outward from the body for engaging said workpiece,
    (c) a micrometer head having a sleeve, thimble and spindle, compressedly affixed into said body at said sleeve with said thimble extending outward from the body and said spindle contiguous to said probe for adjustably positioning said probe from said body, and,
    (d) remote adjustment means attached to said micrometer head for rotational adjustment thereof from the front of the machine tool press brake.

7. The remote adjustment means, as recited in claim 6, further comprising:
    a flexible shaft connected on one end to said micrometer head thimble and the other to a graduated selector knob having indicia thereon indicating the linear position of said micrometer head.

8. The remote adjustment means, as recited in claim 6, further comprising:
    (a) a servomotor,
    (b) at least a pair of gears attached to said servomotor and said micrometer for rotation thereof,
    (c) motor control means for selectively positioning said servomotor, attached by a conduit therebetween, and,
    (d) a visual digital display connected to said motor control means for indicating the position of the servomotor, and hence the micrometer head.

* * * * *